Sept. 15, 1959    J. A. SIMPSON    2,904,340
TRAILER HAVING REMOVABLE SUPPORT MEANS
Filed May 13, 1957    2 Sheets-Sheet 2
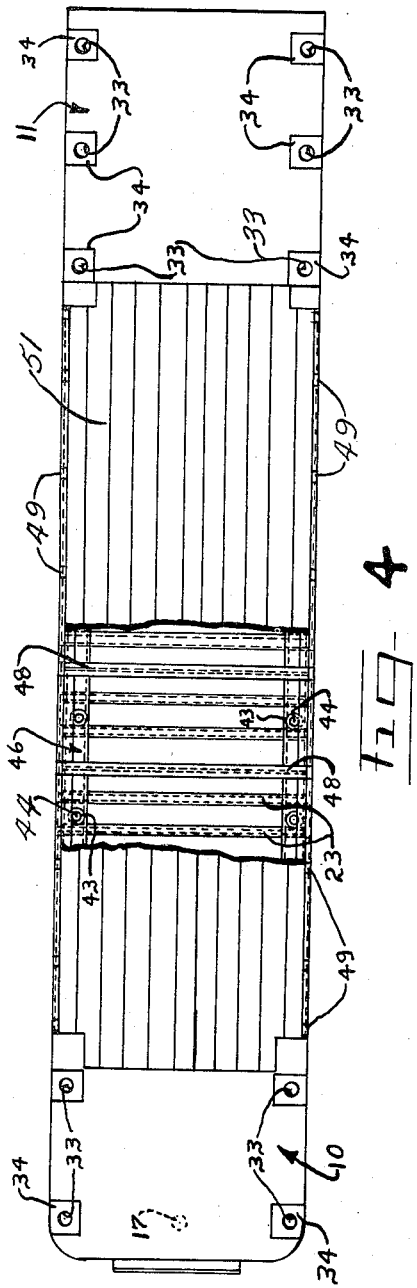
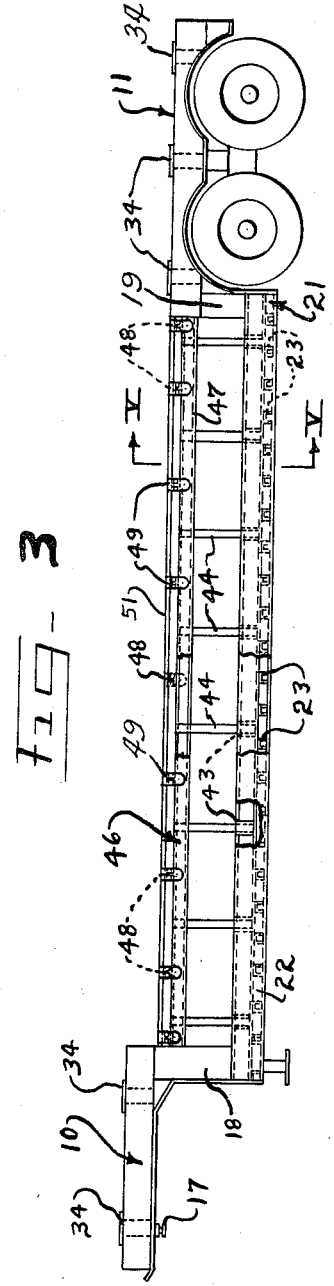
INVENTOR.
John A. Simpson
BY Jennings, Carter & Thompson
Attorneys

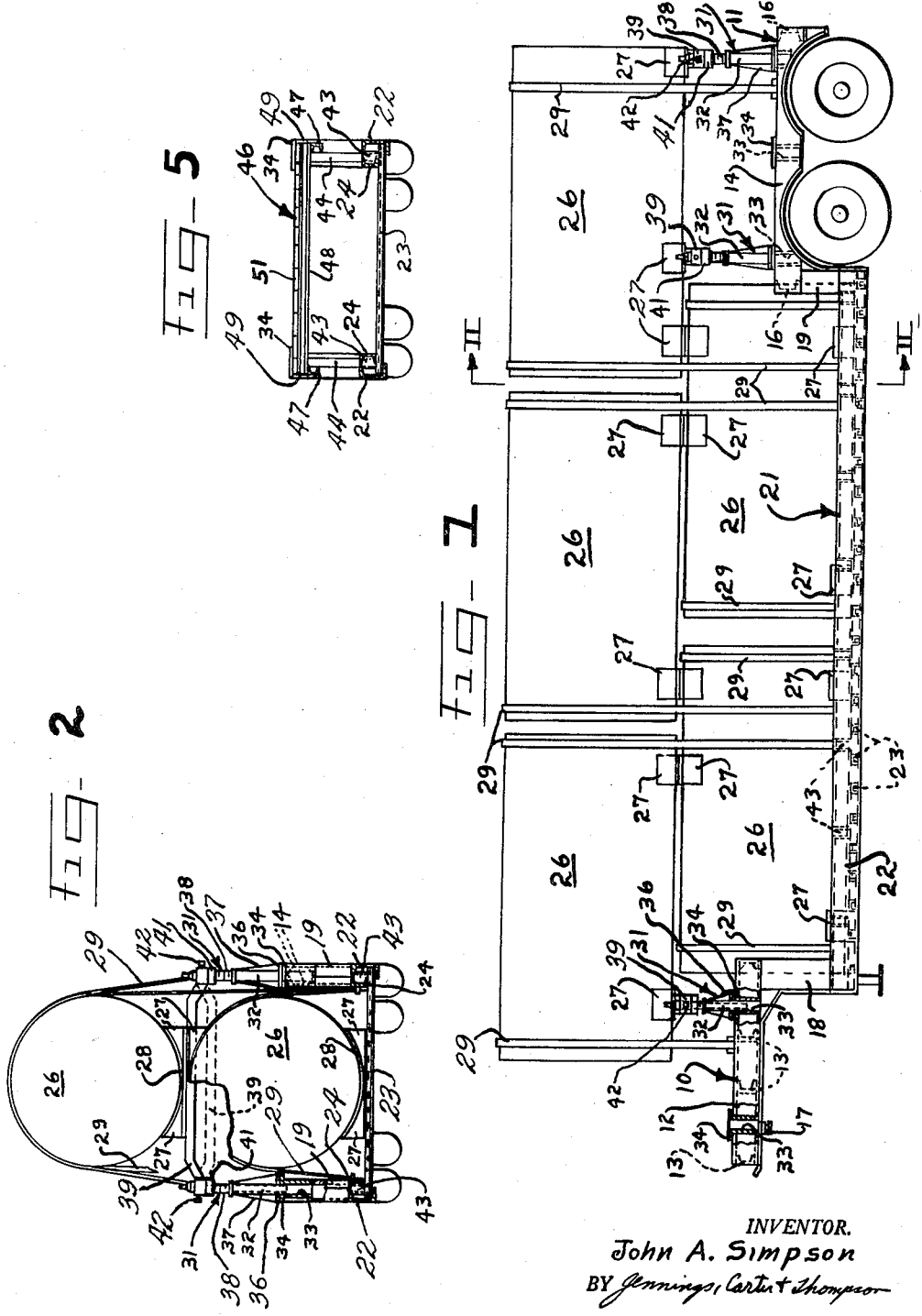

United States Patent Office 2,904,340
Patented Sept. 15, 1959

2,904,340

TRAILER HAVING REMOVABLE SUPPORT MEANS

John A. Simpson, Birmingham, Ala., assignor to Vulcan Trailers Manufacturing Co., Inc., a corporation of Alabama Application May 13, 1957, Serial No. 658,870

1 Claim. (Cl. 280—2)

This invention relates to a trailer and more particularly to a dual purpose trailer which shall be especially adapted for transporting a maximum number of bulky articles in an improved manner as well as transporting smaller articles.

Another object of my invention is to provide a trailer of the character designated which shall embody relatively flat end sections which are connected by a lower intermediate section whereby bulky articles may be supported by the lower intermediate section while other bulky articles are stacked on the articles supported by the intermediate section with the ends of the uppermost article extending over the end sections of the trailer and supported by suitable means.

A further object of my invention is to provide a trailer of the character designated which shall include end sections joined by a lower intermediate section, together with a removable frame adapted to be mounted on the lower intermediate section whereby the upper surface of the removable frame extends in a common plane with the upper surface of the end sections of the trailer, thus providing a substantially continuous load supporting surface when the removable frame is in place.

A still further object of my invention is to provide a trailer of the character designated which shall be simple of construction, economical of manufacture and one which may be readily converted from a generally flat top load supporting surface to a trailer having load supporting surfaces at different elevations.

Apparatus embodying features of my invention is illustrated in the accompanying drawings, forming a part of this application, in which:

Fig. 1 is a side elevational view, partly broken away and in section, showing my trailer adapted for transporting bulky articles;

Fig. 2 is a vertical sectional view taken generally along the line II—II of Fig. 1, partly broken away for the sake of clarity;

Fig. 3 is a side elevational view, partly broken away, showing the removable frame in place whereby a substantially continuous load supporting surface is provided;

Fig. 4 is a plan view of the trailer shown in Fig. 3, partly broken away; and,

Fig. 5 is a vertical sectional view taken generally along the line V—V of Fig. 3.

Referring now to the drawings for a better understanding of my invention, my improved trailer comprises front and rear end sections 10 and 11, respectively, which have substantially flat load carrying surfaces, as shown. The front end section 10 is formed of suitable box channel members 12 which are connected by transverse channel members 13. In like manner, the rear end section 11 is formed of suitable boxed channels 14 which are connected by transverse channel members 16. The front end section 10 is provided with the usual depending king pin indicated at 17 whereby the trailer may be attached to the conventional type fifth wheel unit of a tractor.

Connected to the end sections 10 and 11 by relatively short vertical frame members 18 and 19 is a lower intermediate section 21 which provides a lower off-set section for the trailer. As shown in Fig. 2, the lower off set or intermediate portion 21 comprises side channels 22 having the legs thereof turned inwardly. The side channels 22 are connected by a plurality of transverse channels 23. Secured to the transverse channels 23 and to the inner surface of the side channels 22, as shown in Fig. 2, are longitudinally extending channel members 24.

With the trailer constructed as shown in Figs. 1 and 2, the bulky articles 26 to be transported are loaded by positioning a lower row of such articles on the lower intermediate section 21. In actual practice, I have found that my improved trailer is satisfactory in every respect for transporting cylindrical articles such as cylindrical tanks for carrying aircraft engines and the like. Preferably, the intermediate section 21 of the trailer is of a length to accommodate two of such cylindrical articles 26, as shown in Fig. 1. Three other cylindrical articles 26 are then stacked on the lower articles 26 with the ends of the forwardmost and rearmost upper articles extending over the end sections 10 and 11, respectively.

The lowermost articles 26 are supported on the transverse members 23 by suitable block members 27 which may be connected to each other by a flexible metal strap 28. As shown in Fig. 2, the bottoms of the block members 27 are relatively flat whereby they rest on the transverse members 23 whereas the upper surface thereof is concave to accommodate the adjacent surface of the cylindrical article 26. The uppermost articles 26 are supported from the lowermost articles 26 by similar block members 27 which are connected by the flexible straps 28. As shown in Fig. 2, the block member 27 which is positioned adjacent the upper surface of the lower article 26, is inverted whereby the concave surface is adjacent the curved surface of the lower article. In this position the adjacent flat surfaces of the block members 27 abut, as shown, thus holding the cylindrical articles 26 in spaced relation to each other. Suitable flexible members 29 pass over the cylindrical articles 26 and are secured to the trailer frame, by any suitable means, whereby the articles are held against shifting.

To support the ends of the articles 26 which extend over the end sections 10 and 11, I mount adjustable jack members 31 on the end sections, as shown. Each adjustable jack comprises a tubular member 32 which is adapted to enter suitable sockets 33 which may be in the form of tubular members mounted in the end sections 10 and 11, and having outturned flanges 34 at the upper end thereof, as shown in Figs. 1, 2 and 4. Outturned, horizontal flanges 36 are mounted on the tubular members 32 in position to engage the flanges 34 and limit downward movement of the tubular member relative to the socket 33. Suitable gusset members 37 connect the tubular member 32 to the horizontal flange 36 to add strength to the jack member. The tubular member 32 is threaded internally for receiving an externally threaded lower end of an actuating member 38. The actuating member 38 is provided with a polygonal upper end for receiving a suitable tool which may be in the form of a hand wheel whereby the actuating member may be rotated relatively to the internally threaded tubular member 32.

Extending transversely over the end sections 10 and 11 and connected to the upper ends of the actuating members 38 are transverse support members 39 which are adapted to engage the undersurface of block members 27 which are positioned beneath the ends of the cylindrical articles 26, as shown in Fig. 1. The upper ends of the actuating members 38 are unthreaded and the transverse support member 39 is supported thereon by suitable collars 41 which are secured to the actuating members 38, thus limiting downward movement of the support members 39 relative to the actuating member. The support members 39 are locked in place by set screws 42 after final leveling adjustment of the actuating members 38. It will thus be seen that upon rotation of the actuating member 38 there is no axial movement of the support member 39 relative to the actuating member. Preferably, the intermediate portion of the support member 39 is off set, as shown in Fig. 2, whereby it may move to the dotted line position, thus permitting the jack member 31 to operate over a greater range.

As shown in Fig. 3, a plurality of sockets 43 are provided in the channel members 22 and 24 for receiving depending support members 44 for a removable frame indicated generally at 46. As shown in Fig. 3, the removable frame 46 extends the length of the lower intermediate section 21 and comprises side channel members 47 which are connected to the upper ends of the depending support members 44. Extending across the upper surface of the side channel members 47 are transverse I-beams 48 which are connected to the side members 47 by suitable brackets 49, as shown. Mounted on top of the transverse I-beams 48 is a suitable supporting deck 51. As shown in Fig. 3, the upper surface of the deck 51 is substantially level with the upper deck of the end section 11 whereby a substantially continuous load supporting surface is provided which extends the length of the removable frame 46 and the end section 11.

From the foregoing description, the operation of my improved trailer will be readily understood. When it is desired to transport bulky articles, such as cylindrical tanks for aircraft engines and the like, I mount a lower row of the cylindrical articles 26 on the lower intermediate section 21 and then mount an upper row of articles on the lowermost row thereof, as shown in Figs. 1 and 2. It will be noted that the blocks 27 are positioned beneath the lowermost cylindrical articles 25 and between the upper and lower articles, as described hereinabove.

With the ends of the upper forwardmost and rearmost articles extending over the forward and rear end sections 10 and 11, respectively, I mount the jack members 31 in the sockets 33 with the transverse support members 39 positioned beneath the outwardly projecting ends of the uppermost cylindrical articles. The polygonal upper end of the actuating member 38 is then turned by a suitable tool whereby the actuating member 38 moves axially of the tubular member 32 thus raising or lowering the transverse support member 39 to the desired position. A block member 27 is positioned on the transverse support member 39 and the block member is then brought into engagement with the under surface of the cylindrical article 26, as shown in Fig. 1. In order to accommodate various lengths of articles 26, I provide a plurality of sockets 33 in the end sections 10 and 11 whereby the adjustable jack members 31 may be moved to various locations to accommodate the particular article being transported. With the ends of the forwardmost and rearmost cylindrical articles 26 supported by the adjustable jack members 31, the straps 29 are secured in place thus preventing shifting of the articles while they are being transported.

To form a relatively flat continuous load supporting surface for the trailer, I position the removable frame 46 within the offset portion defined by the lower intermediate section 21. The depending support members 44 are positioned within the sockets 43 whereby the deck 51 of the removable frame 46 lies in substantially the same horizontal plane as the deck of the end section 11.

In view of the foregoing, it will be seen that I have devised an improved dual purpose trailer which may be readily converted from a trailer having a flat continuous load supporting surface to a trailer having load supporting surfaces at different elevations whereby a maximum number of bulky articles may be transported.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

A dual purpose trailer comprising a flat rear end section over the rear wheels of the trailer, an intermediate flat section adjacent the rear end section disposed at a level below the level of said rear end section, vertical members rigidly connecting the rear end of said intermediate flat section to said rear end section, a flat front end section adjacent the front end of said intermediate section and disposed at a level above the level of the rear end section and the intermediate section to form therewith load supporting surfaces at three different elevations whereby lower bulky articles may be supported on said intermediate section with other bulky articles stacked on the lower bulky articles to extend over the end sections, vertical members rigidly connecting the forward end of said intermediate section to said front end section, an integral removable load supporting frame extending between the vertical members connecting the end sections to the intermediate section and having a flat upper surface in substantially the same horizontal plane as the upper surface of the rear end section and below the upper surface of the front end section, means attaching the removable frame in supporting relation on the intermediate section whereby a continuous flat load supporting surface is formed by the rear end section and the removable frame when the frame is attached to said intermediate section, and vertically adjustable support means mounted on each of said end sections adapted to engage in supporting relation the extending ends of bulky articles supported on the intermediate section when the removable section is removed therefrom.

References Cited in the file of this patent

UNITED STATES PATENTS

| | | |
|---|---|---|
| 1,422,034 | Collier | July 4, 1922 |
| 2,579,003 | Josephian | Dec. 18, 1951 |
| 2,684,264 | Demos | July 20, 1954 |
| 2,687,225 | Martin | Aug. 24, 1954 |
| 2,782,733 | Ewing | Feb. 26, 1957 |